(12) United States Patent
Kimura (10) Patent No.: US 10,701,267 B2
(45) Date of Patent: Jun. 30, 2020

(54) POSITION DETECTION DEVICE, CONTROL METHOD, AND STORAGE MEDIUM

(71) Applicant: CANON KABUSHIKI KAISHA, Tokyo (JP)

(72) Inventor: Masafumi Kimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 295 days.

(21) Appl. No.: 15/189,585

(22) Filed: Jun. 22, 2016

(65) Prior Publication Data

US 2016/0377453 A1 Dec. 29, 2016

(30) Foreign Application Priority Data

Jun. 23, 2015 (JP) .................................. 2015-125234

(51) Int. Cl.
*G01D 5/14* (2006.01)
*H04N 5/232* (2006.01)
*G03B 3/10* (2006.01)

(52) U.S. Cl.
CPC ......... *H04N 5/23264* (2013.01); *G01D 5/145* (2013.01); *G03B 3/10* (2013.01); *G03B 2205/0053* (2013.01)

(58) Field of Classification Search
None
See application file for complete search history.

(56) References Cited

U.S. PATENT DOCUMENTS

2002/0167306 A1* 11/2002 Zalunardo .............. G01D 5/145
324/207.2
2003/0098686 A1* 5/2003 Mednikov ................ F01L 9/04
324/207.21

(Continued)

FOREIGN PATENT DOCUMENTS

JP 2004-348173 A 12/2004
JP 2008241345 10/2008

(Continued)

OTHER PUBLICATIONS

Tokunaga et al. ; Position Sensor, Magnet Member and Manufacturing Method for Magnet Member; Oct. 25, 2012; ALPS Electric Co Ltd; JP2012208112 (A); G01D5/12; H01F13/00 (Year: 2012).*

(Continued)

*Primary Examiner* — Nasima Monsur
(74) *Attorney, Agent, or Firm* — Carter, DeLuca & Farrell LLP (57) ABSTRACT

A position detection device including a magnetic detection unit, a magnet, and a calculation unit that calculates a position detection signal based on a signal of the magnetic detection unit is provided. The magnet and the magnetic detection unit are relatively movable while maintaining a predetermined interval. The magnetic detection unit has a longitudinal magnetic field detection unit that detects a magnetic field in a separating direction between the magnetic detection unit and the magnet, and has a transverse magnetic field detection unit that detects a magnetic field in a moving direction of the magnet 1. A calculation unit 5 calculates a position detection signal based on a signal of the transverse magnetic field detection unit and a signal of the longitudinal magnetic field detection unit.

7 Claims, 10 Drawing Sheets

(56) References Cited

U.S. PATENT DOCUMENTS

| | | | |
|---|---|---|---|
| 2005/0258822 A1* | 11/2005 | Hara | G01D 5/145 324/207.2 |
| 2007/0285522 A1* | 12/2007 | Kimura | H04N 5/23248 348/208.99 |
| 2009/0039875 A1* | 2/2009 | Hoshino | G01D 5/145 324/207.21 |
| 2009/0153134 A1* | 6/2009 | Matsumoto | G01D 5/142 324/207.11 |
| 2009/0206827 A1* | 8/2009 | Aimuta | G01D 5/145 324/207.25 |
| 2013/0127457 A1* | 5/2013 | Musha | B82Y 25/00 324/252 |

FOREIGN PATENT DOCUMENTS

| | | |
|---|---|---|
| JP | 2008261786 | 10/2008 |
| JP | 2012208112 | 10/2012 |

OTHER PUBLICATIONS

Japanese Office Action for application No. 2015125234 dated Apr. 2, 2019 with English translation.

* cited by examiner

# POSITION DETECTION DEVICE, CONTROL METHOD, AND STORAGE MEDIUM

BACKGROUND OF THE INVENTION

Field of the Invention

The present invention relates to a position detection device, a control method, and a storage medium.

Description of the Related Art

In recent years, the necessity of miniaturized and highly accurate positioning has been increasing in various fields, and in consumer products, position detection with a simple configuration and stability has been desired. In particular, portable electronic devices need to be robust to environmental changes including temperature and the like, and mass-produced electronic devices are desired to be robust to errors occurring in assembly (assembly errors).

Japanese Patent Application Laid-Open Publication No. 2004-348173 discloses a position detection device in which a difference signal between two magnetic sensors provided at intervals is divided by a sum signal to serve as an output signal.

Because the position detection device disclosed in Japanese Patent Application Laid-Open Publication No. 2004-348173 sensitively reacts to a tilt in a direction in which the interval between the two magnetic sensors and a magnet change, it is impossible to perform position detection that is robust to assembly errors or environmental changes.

SUMMARY OF THE INVENTION

The present invention provides a position detection device that is robust to assembly errors or environmental changes, with a simple configuration.

A position detection device in one embodiment of the present invention comprises a magnetic detection unit; a magnet; and an calculation unit that is configured to calculate a position detection signal based on a signal of the magnetic detection unit. The magnet and the magnetic detection unit are relatively movable while maintaining a predetermined interval, and the magnetic detection unit has a longitudinal magnetic field detection unit that detects a magnetic field in a separating direction between the magnetic detection unit and the magnet, and a transverse magnetic field detection unit that detects a magnetic field in a moving direction of the magnet, and the calculation unit calculates the position detection signal based on a signal of the transverse magnetic field detection unit and a signal of the longitudinal magnetic field detection unit.

According to the present invention, it is possible to provide a position detection device that is robust to assembly errors or environmental changes, with a simple configuration.

Further features of the present invention will become apparent from the following description of exemplary embodiments (with reference to the attached drawings).

DESCRIPTION OF THE EMBODIMENTS

First Embodiment

Figure 1A:
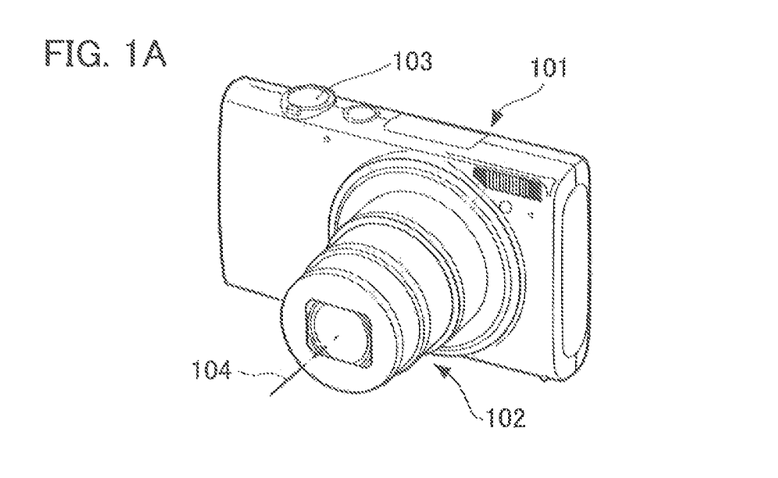
FIGS. 1A to 1C are configuration examples of an electronic apparatus including a position detection device.
Figure 1B:
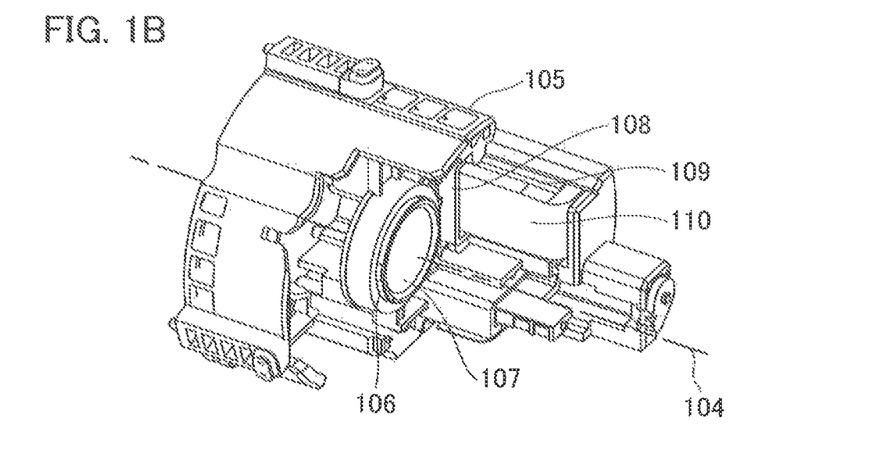
Figure 1C:
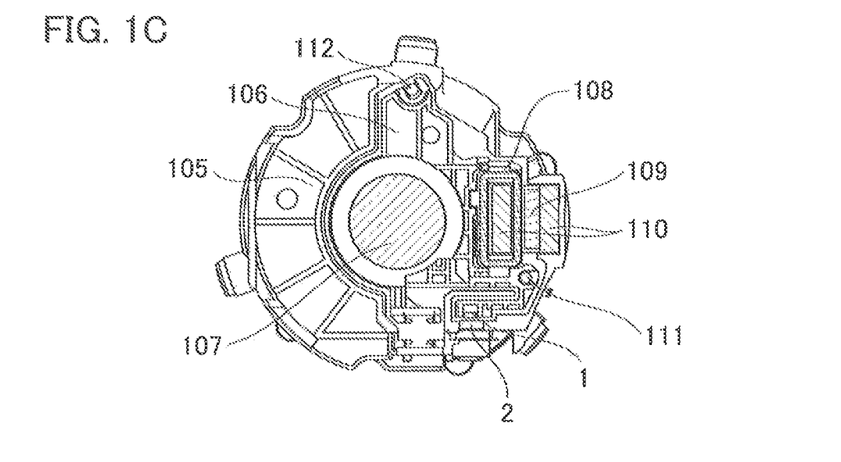

FIGS. 1A to 1C are configuration examples of an electronic apparatus including a position detection device of the present embodiment. The electronic apparatus shown in FIGS. 1A to 1C is an image capturing apparatus, for example, a digital camera. FIG. 1A shows a perspective view of the digital camera. FIG. 1B shows a perspective view of a part of a lens barrel included in the digital camera. FIG. 1C shows a cross-sectional view of the lens barrel shown in FIG. 1B.

As shown in FIG. 1A, a digital camera 101 includes a lens barrel 102 and an operation member 103. Reference numeral 104 is the optical axis of an imaging lens. As shown in FIGS. 1A and 1B, the lens barrel 102 includes a magnet 1, a magnetic detection unit 2, a lens holding frame 106, a lens 107, and a coil 108. Reference numeral 105 shows a fixed portion of the lens barrel. Additionally, reference numeral 109 is a magnet that drives the lens. Reference numeral 110 shows a yoke forming a magnetic circuit. Reference numerals 111 and 112 show guide bars, respectively.

The digital camera 101 executes operations such as focusing and the like in accordance with a user's operation using the operation member 103. At this time, the focus lens 107 provided in the lens barrel 102 moves along the optical axis 104 and accordingly a focusing operation is performed.

The magnet 1, the lens 107, and the coil 108 are fixed on the lens holding frame 106, and the magnetic detection unit 2, the drive magnet 109, and the yoke 110 are fixed on the fixed portion 105 of the lens barrel. Furthermore, the lens holding frame 106 is guided by the guide bars 111 and 112, and is movable along the optical axis 104. By energizing the coil 108, the lens holding frame 106 can be moved along the optical axis 104. By the above structure, the magnet and the magnetic detection unit are made relatively movable while maintaining a constant interval.

In order to properly perform focusing, the lens 107 must be moved to a specific position. In the present embodiment, the magnet 1 and the magnetic detection unit 2 are provided, and consequently the position detection device that detects a position of the lens holding frame 106 from a signal of the magnetic detection unit 2 is realized.

Figure 2A:
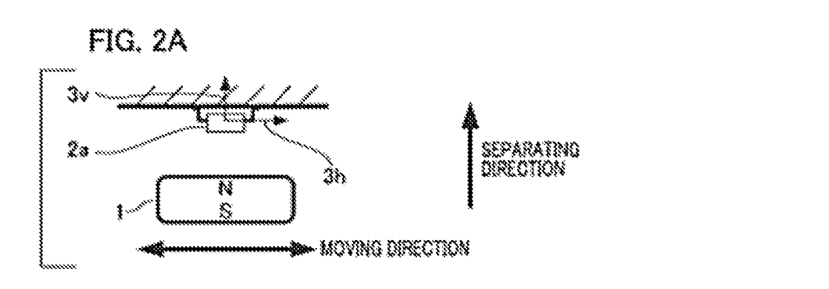
FIGS. 2A to 2D illustrate a position detection device in Embodiment 1.

FIGS. 2A to 2D illustrate the position detection device of the Embodiment 1. FIG. 2A shows arrangement of each unit included in the position detection device. In the Embodiment 1, the magnet 1 included in the position detection device is a single-pole, and includes one of each of a north pole and a south pole. An element $2a$ functions as a magnetic detection unit having a longitudinal magnetic field detection unit $3v$ and a transverse magnetic field detection unit $3h$. The base of the arrows $3v$ and $3h$ indicates a position in which the longitudinal magnetic field detection unit $3v$ and the transverse magnetic field detection unit 3h are present, and the direction of the arrows indicates a direction of the magnetic detection. The longitudinal magnetic field detection unit 3v and the transverse magnetic field detection unit 3h are formed so as to be stacked in a separating direction between the magnet 1 and the element 2a. The magnet 1 and the element 2a are relatively movable in the horizontal direction of the drawing sheet of FIG. 2A while maintaining a predetermined interval. In FIGS. 1A to 1C, although the element 2a is illustrated in a fixed state, it is sufficient if the magnet 1 and the element 2a relatively move, and it is also sufficient that the element 2a is moved while fixing the magnet 1. Additionally, a movement is guided to maintain a constant interval in the separating direction.

Figure 3A:
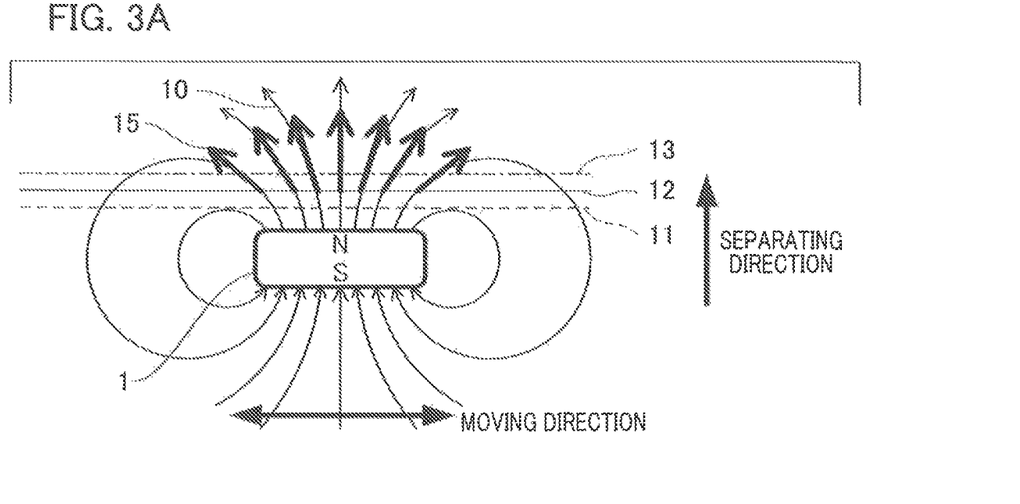
FIGS. 3A to 3C illustrate a magnetic field in the Embodiment 1.
Figure 3B:
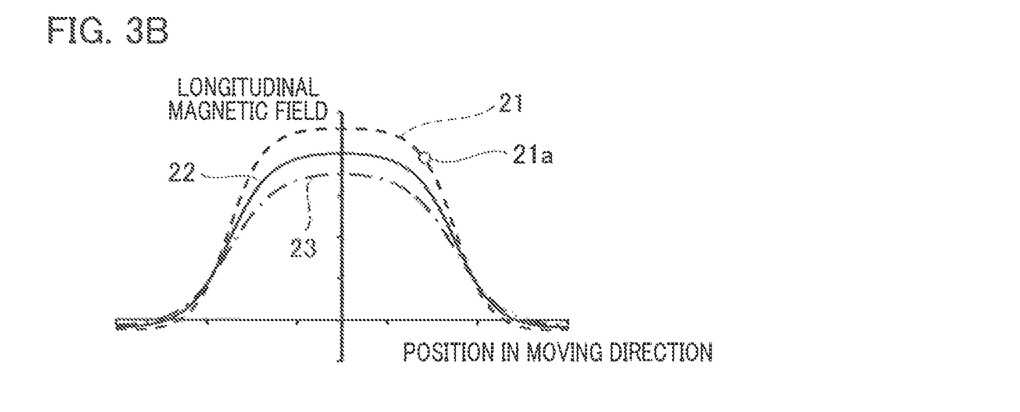
Figure 3C:
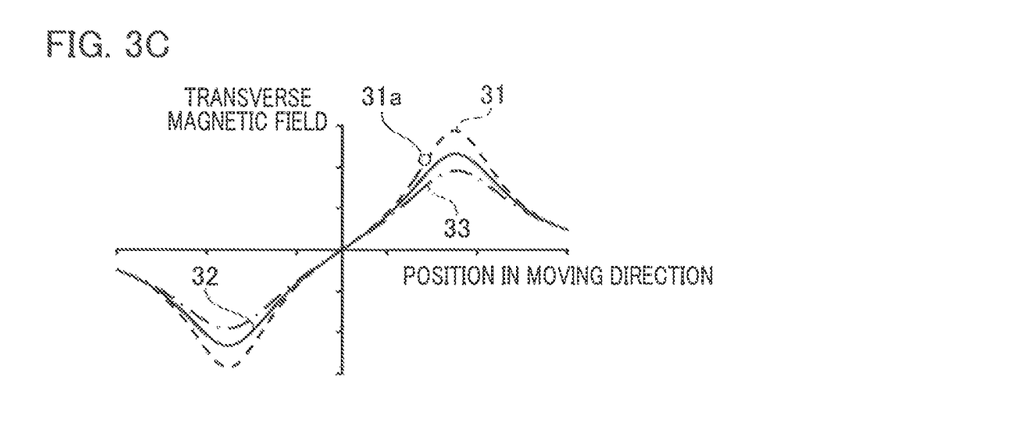

FIGS. 3A to 3C illustrate a magnetic field in the Embodiment 1. In FIG. 3A, reference numeral 10 shows a line of magnetic force. Reference numerals 11, 12, and 13 show three planes that differ in distance from the magnet 1. Reference numeral 15 shows a magnetic field strength observed on the plane 12. FIGS. 3B and 3C are graphs respectively showing the magnetic field strength in the longitudinal magnetic field and the transverse magnetic field with respect to the position in the moving direction. The horizontal axis represents a position in the moving direction. The vertical axis represents a magnetic field strength. The longitudinal magnetic field is a magnetic field in a direction in which the magnet and the magnetic detection unit separate (separating direction). The transverse magnetic field is a magnetic field in a direction in which the magnet and the magnetic detection unit relatively move (moving direction). Intersection with the horizontal axis indicates that the magnetic field strength in the direction is zero.

Each magnetic field strength shown by reference numerals 21, 22, and 23 in FIG. 3B and reference numerals 31, 32, and 33 in FIG. 3C corresponds to the planes 11, 12, and 13 in FIG. 3A. As notation, a case in which the magnet 1 and the magnetic detection unit approach each other is shown by a broken line, a case in which the magnet and the magnetic detection unit recede from each other is shown by a one dot chain line, and a case in which they are located at the middle of the two cases is shown by a solid line. This notation is the same in the other drawings.

In FIG. 3B and FIG. 3C, reference numerals 21a and 31a respectively show the points on lines 21 and 31 that represent the magnetic field strength at the identical position. The cross-section of FIG. 3A is a cross-sectional view that is cut out along a plane including a direction in which the magnet and the magnetic detection unit relatively move and a direction in which the magnet and the magnetic detection unit separate from each other. A magnet with a suitable length extends in a direction perpendicular to the drawing sheet of FIG. 3A, and has a configuration that is robust to assembly errors in the direction perpendicular to the drawing sheet.

As shown in FIG. 3A, a vector that represents a magnetic field strength is detected, like the arrow 15, while changing the length and angle in a plane on which the magnetic detection unit is present. That is, in the vicinity of the center of the magnet 1, the vector has a maximum length, and is directed in a direction in which the magnet and the magnetic detection unit separate from each other. As shown in FIG. 3A, the vector gradually tilts and the magnetic strength weakens toward the end of the magnet 1.

As shown in FIG. 3B, the magnetic field strength of the longitudinal magnetic field is shown by curves in which the maximum value is met at the center of the magnet. Additionally, curves 21, 22, and 23 of the magnetic field strength in the detection planes 11, 12, and 13 indicate a tendency in which the peak strength becomes stronger if the detection is performed at a position near the magnet. Additionally, as shown in FIG. 3C, the magnetic field strength of the transverse magnetic field becomes zero at the center of the magnet, forming an S-shaped curve. Additionally, the curves 21, 22, and 23 of the magnetic field strength in the detection planes 11, 12, and 13 indicate a tendency in which a difference between the maximum value and the minimum value is larger if the detection is performed at a position near the magnet.

Figure 4A:
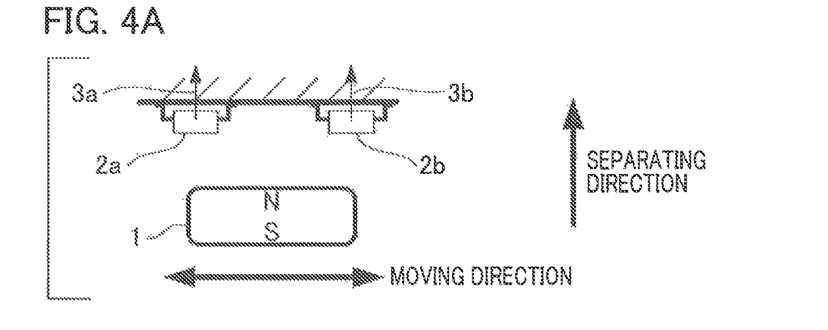
FIGS. 4A to 4E illustrate a calculation method for position detection and an influence of assembly errors.
Figure 4B:
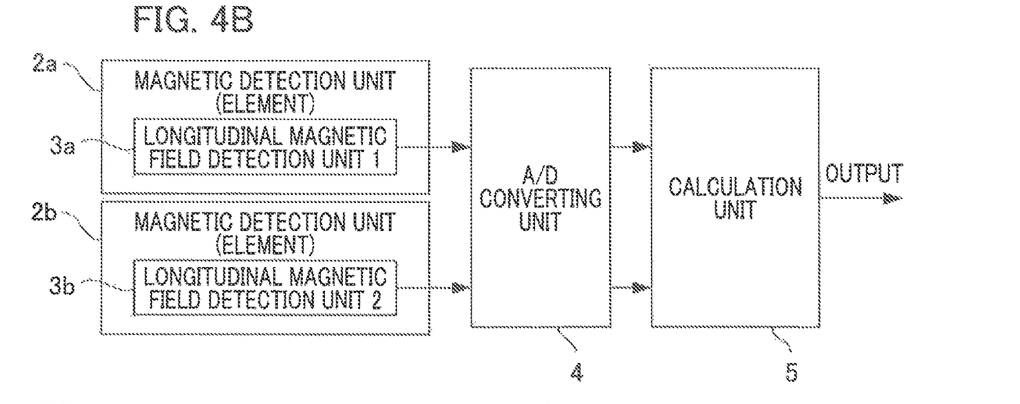
Figure 4C:
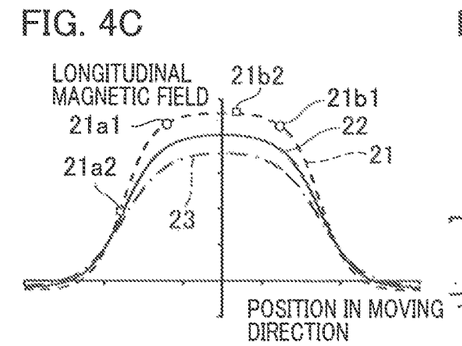

FIGS. 4A to 4E and FIGS. 5A to 5D illustrate a calculation method for the position detection in the prior art, and the influence of assembly errors. In FIGS. 4A and 4B, reference numeral 1 shows a magnet, reference numerals 2a and 2b show two magnetic detection units, reference numerals 3a and 3b show two longitudinal magnetic field detection units, reference numeral 4 shows an A/D converting unit, and reference numeral 5 shows a calculation unit. FIG. 4C is a graph showing the magnetic field strength of the magnetic field with respect to a relative movement direction between the magnet and the magnetic detection unit. The horizontal axis represents a position in the moving direction, and the vertical axis represents a magnetic field strength of the longitudinal magnetic field. The notation of the reference numerals 21, 22, and 23 in the graph is the same as that in FIG. 3B. Reference numerals 21a1, 21b1, 21a2, and 21b2 respectively show points on the line 21 that represent the magnetic field strength.

Figure 4D:
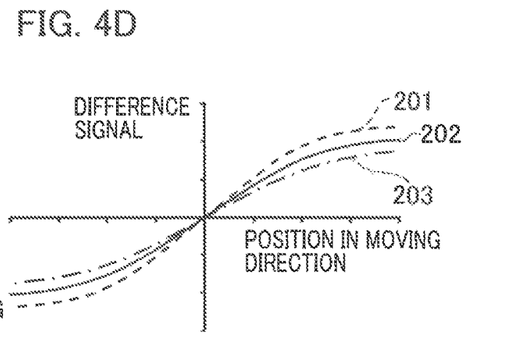
Figure 4E:
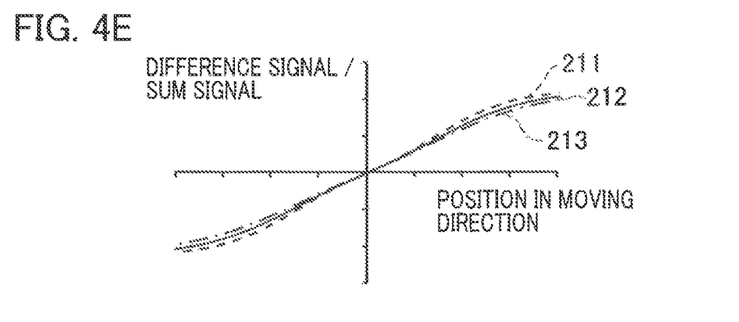

FIGS. 4D and 4E are graphs showing an output of the calculation unit when two types of calculations are performed. The horizontal axis represents a position in the moving direction, and the vertical axis represents an output of the calculation unit. Calculation results for a case in which the magnet and the magnetic detection units are located closely is shown in the order of lines 201, 202, 203 and lines 211, 212, and 213. However, the horizontal axis in FIGS. 4D and 4E is enlarged in the vicinity of the center, the scale of which is different from that of FIG. 4C, enlarging range in the vicinity of the center of FIG. 4C by about 40%.

FIG. 4A illustrates a specific arrangement of the magnet and the magnetic detection unit in the prior art. Reference numerals 2a and 2b are two magnetic detection units, and the detection direction is the direction of arrows 3a and 3b shown in FIG. 4A. The base of the arrows 3a and 3b indicates the position in which the longitudinal magnetic field detection unit is represented, and the direction of the arrow indicates the detecting direction of the magnetism. The magnetic detection units are located in the vicinity of the center of each of the elements 2a and 2b. The magnet 1 and the element 2a are relatively movable in the horizontal direction of the drawing sheet in FIG. 4A. Although the element 2a is illustrated in a fixed state, it is sufficient if the magnet 1 and the element 2a relatively move, and it is also sufficient that the element 2a is moved while fixing the magnet 1. Additionally, a movement is guided while maintaining a constant interval in the separating direction.

FIG. 4B is a block diagram illustrating a flow of signals in the prior art. A signal acquired from the longitudinal magnetic field detection units 3a and 3b provided in the elements 2a and 2b is transmitted to the A/D converting unit 4. Subsequently, the signal is transmitted to the calculation unit 5, and the calculation as shown below is performed.

(Output signal)=(longitudinal magnetic field strength 2)−(longitudinal magnetic field strength 1) (Formula 1)

$$\text{(Output signal)} = \{\text{(longitudinal magnetic field strength 2)} - \text{(longitudinal magnetic field strength 1)}\} / \{\text{(longitudinal magnetic field strength 2)} + \text{(longitudinal magnetic field strength 1)}\} \quad \text{(Formula 2)}$$

In Japanese Patent Application Laid-Open Publication No. 2004-348173, Formula 2 is used. The results for calculation using the Formula 1 and Formula 2 are shown in FIGS. 4D and 4E, respectively. Here, the following is defined:

$$\text{(Difference signal)} = \text{(longitudinal magnetic field strength 2)} - \text{(longitudinal magnetic field strength 1)} \quad \text{(Formula 3)}$$

$$\text{(Sum signal)} = \text{(longitudinal magnetic field strength 2)} + \text{(longitudinal magnetic field strength 1)} \quad \text{(Formula 4)}$$

That is, Formula 1 is the difference signal itself, and Formula 2 is acquired by dividing the difference signal by the sum signal. FIGS. 4D and 4E are shown in accordance with the above definition.

Here, signals $21a1$ and $21b1$ corresponding to the two elements $2a$ and $2b$ are simulated. The difference signal is defined as a difference between the signal $21b1$ and the signal $21a1$. The sum signal is defined as the sum of the signal $21b1$ and the signal $21a1$.

As shown in FIG. 4C, the distribution of the magnetic field strength of the longitudinal magnetic field with respect to the magnet 1 is axisymmetric, and the difference signal becomes zero at the center. A case in which the magnet 1 moves relatively from this location to the right in FIG. 4A is considered. Signals corresponding to the two elements $2a$ and $2b$ respectively change to the signal $21a2$ and the signal $21b2$. At this time, the difference signal is defined as the difference between the signal $21b2$ and the signal $21a2$, and the sum signal is defined as the sum of the signal $21b2$ and the signal $21a2$. When considering the subsequent signals in the same way and plotting them, functions as shown by the lines in FIGS. 4D and 4E can be acquired.

When comparing FIGS. 4D and 4E, it can be seen that the three functions 211, 212, and 213 in FIG. 4E are closer to each other than the three functions 201, 202, and 203 in FIG. 4D that differ in distance. This indicates that a method for acquiring a function in FIG. 4E, that is, a method for dividing the difference signal by the sum signal shown by the Formula 2 is robust to assembly errors such as the change of distance.

Additionally, in this example, although a permanent magnet is used, the surface magnetic flux density of the permanent magnet changes depending on the temperature. Generally, the magnetic flux density increases at a low temperature. The manner of this change provides a change similar to the change of distance. That is, it can also be said that the method of dividing the difference signal by the sum signal is robust to temperature change. However, the prior art shown in FIGS. 4A to 4E, contains the matter described below.

Figure 5A:
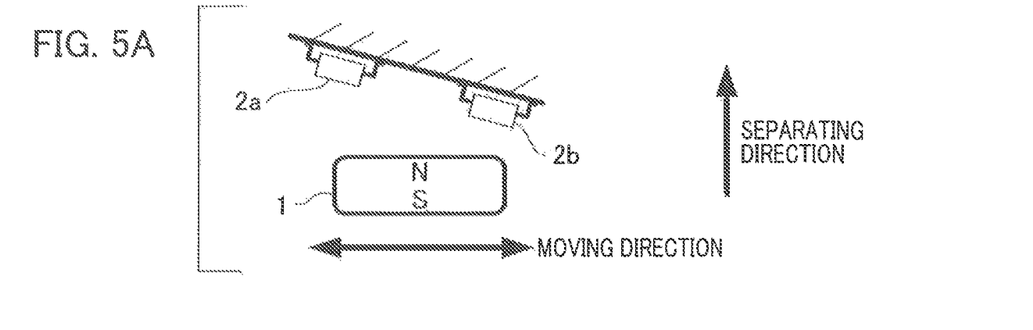
FIGS. 5A to 5D illustrate a calculation method for position detection and an influence of assembly errors.
Figure 5B:
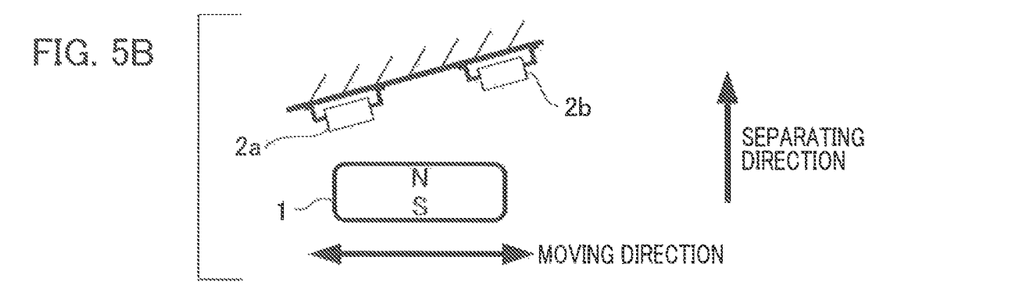
Figure 5C:
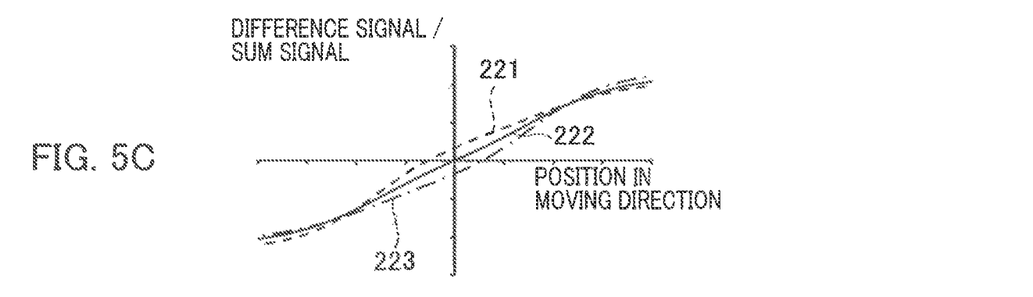
Figure 5D:
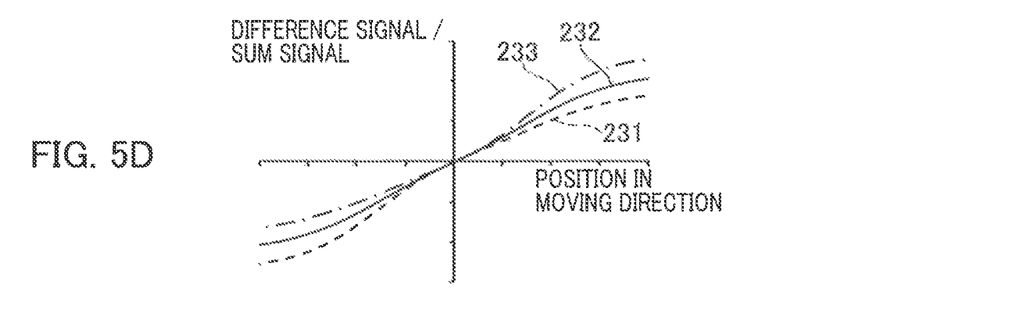

FIGS. 5A to 5D illustrate the matter of the prior art. FIGS. 5A and 5B illustrate a relative tilt between the magnet and the element. FIGS. 5C and 5D illustrate an output of the calculation unit. The horizontal axis of FIGS. 5C and 5D are located in the moving direction of the scale similar to those in FIGS. 4D and 5E, and the vertical axis indicates the calculation result.

FIGS. 5A and 5B show a case in which the magnet and the element relatively rotate around the axis that is orthogonal to the separating direction and the moving direction. FIG. 5A illustrates a case in which the magnet and the element rotate such that one element $2a$ recedes from the magnet 1 and the other element $2b$ rotates so as to approach the magnet 1. FIG. 5B illustrates a case in which the magnet and the elements rotate in a direction opposite to the rotating direction in the example shown in FIG. 5A.

When calculation is performed using Formula 2, which is a calculation formula of the output signal in FIG. 4E, the output shown in FIG. 5C is obtained. Three functions 211, 222, and 223 respectively correspond to the state of FIG. 5A, the state of FIG. 4A, and the state of FIG. 5B, which are signals in a case where a tilt between the magnet and elements differs.

Due to the change of the distance to the magnet 1, when the rotation has occurred, the functions 221 and 223 do not pass through the starting point, and the signal is not zero at the center position of the magnet. The output when offset adjustment has been performed by assembly adjustment is shown in FIG. 5D. Each of the functions 231, 232, and 233 in FIG. 5D is obtained by performing offset adjustment so as to pass the functions 221, 222, and 223 in FIG. 5C through the starting point.

When comparing FIG. 5D and FIG. 4E, the three functions 231, 232, and 233 that differ in tilt are larger in variability than the three functions 211, 212, and 213 that differ in distance. That is, the output signal that is applied to the prior art and acquired by dividing the difference signal by the sum signal is readily affected by the rotation direction such as two elements that are different in the separating direction, as compared with the distance change in the separating direction. In contrast, in order to hold the magnet or the magnetic detection unit so as to be movable in the direction defined as the moving direction, an appropriate gap is required in the guide unit, and it is difficult to eliminate the rotation in the direction indicated by FIGS. 5A to 5D in principle.

Figure 2B:
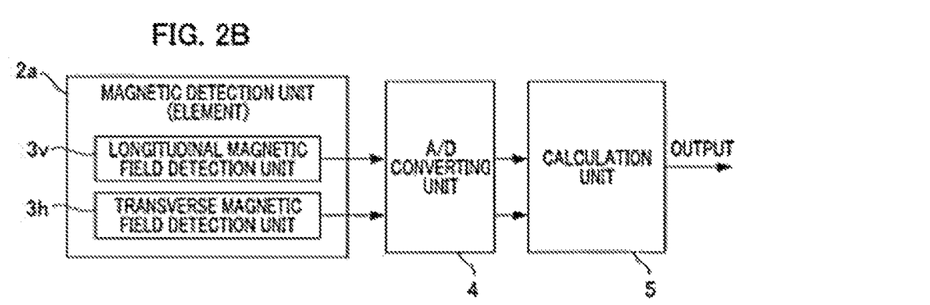

The description will return to FIGS. 2A to 2D. FIG. 2B is a block diagram that illustrates a flow of a signal in the position detection device in Embodiment 1. The element $2a$ includes the longitudinal magnetic field detection unit $3v$ and the transverse magnetic field detection unit $3h$. The signal acquired from the longitudinal magnetic field detection unit $3v$ and the transverse magnetic field detection unit $3h$ included in the element $2a$ is transmitted to the A/D converting unit 4 and converted into digital data. The digital data is transmitted to the calculation unit 5 and the calculation unit 5 performs calculation using Formula 5 or Formula 6 shown below.

$$\text{(Output signal)} = \text{(transverse magnetic field strength)} / \text{(longitudinal magnetic field strength)} \quad \text{(Formula 5)}$$

$$\text{(Output signal)} = \tan^{-1}\{\text{(transverse magnetic field strength)} / \text{(longitudinal magnetic field strength)}\} \quad \text{(Formula 6)}$$

That is, the calculation unit 5 functions as a calculation unit that calculates a position detection signal based on the signal of the magnetic detection unit. The calculation unit 5 divides either one of the signal of the transverse magnetic field detection unit $3h$ or the signal of the longitudinal magnetic field detection unit $3v$ by the other one thereof, or performs calculations by inverse tangent function based on the signal of the transverse magnetic field detection unit $3h$ or the signal of the longitudinal magnetic field detection unit $3v$. The calculation by inverse tangent function is performed by the result obtained by dividing either one of the signal of the transverse magnetic field detecting portion $3h$ or the signal of the longitudinal magnetic field detection unit $3v$ by the other one thereof as a variable serving as a variable.

In FIG. 2B, although the A/D converting unit 4 calculates based on the digitized signal, it may calculate by remaining an analog signal. Using either of Formula 5 or Formula 6 is defined by determining the performance of the calculation unit 5, the sampling frequency, the presence or absence of the singularity, and the like. A point to focus on for determination will be described below.

Figure 2C:
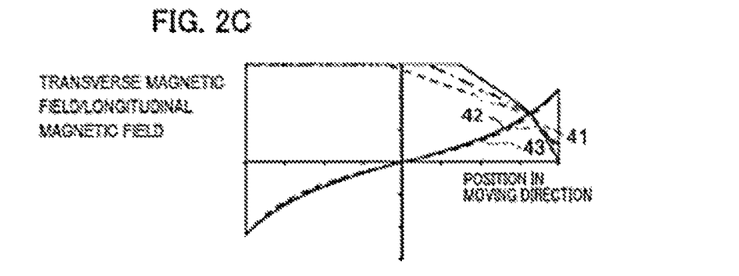
Figure 2D:
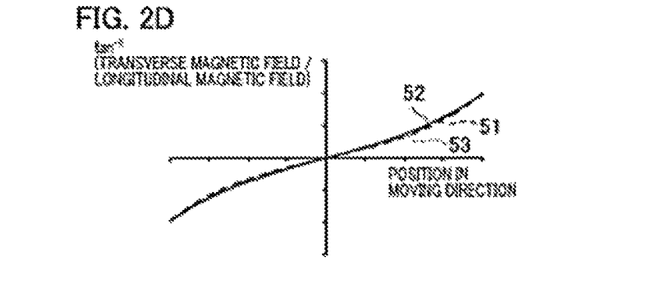

FIG. 2C shows an output when the calculation is performed using Formula 5 by the calculation unit 5. FIG. 2D shows an output when a calculation is performed using Formula 6 by the calculation unit 5. The horizontal axis of FIGS. 2C and 2D shows a position in the moving direction of the scale similar to those in FIGS. 4D and 4E. The vertical axis represents the output of the calculation unit 5. Additionally, the calculation results when the magnet and the magnetic detection unit are close are shown in the order of lines 41, 42, 43 and lines 51, 52, 53.

Hereinafter, a specific calculation method using Formula 5 and Formula 6 will be described. When taking into consideration a position in the moving direction in FIGS. 3B and 3C, it is possible to acquire a signal corresponding to the reference numerals 21a and 31a from the longitudinal magnetic field detection unit 3v and the transverse magnetic field detection unit 3h. Formula 5 is defined as the result for dividing the signal of the numeral reference 31a by that of the reference numeral 21a. Formula 6 is defined as the result for further substituting the result for Formula 5 by an inverse tangent function. When the position of the magnet 1 and that of the element 2a, which is a magnetic detection unit, relatively change, the above values may be acquired at a position in which the magnetic detection unit is present. When considering the subsequent signals in the same way and plotting them, functions as shown in the graph in FIGS. 2C and 2D can be acquired.

When comparing FIGS. 2C and 2D with FIG. 4E, a set of three functions 41, 42, and 43 in FIG. 2C and a set of three functions 51, 52 and 53 in FIG. 2D approach each other more than the three functions 211, 212, and 213 in FIG. 4E that differ in distance. This indicates that the calculations by Formula 5 and Formula 6, which are applied in the present embodiment, are more robust to assembly errors such as the change of distance than a method in which the difference signal is divided by the sum signal shown in Formula 2. Note that the graphs shown in FIGS. 2A to 2D and FIGS. 4A to 4E show a calculation example in which the calculation has been performed by CAE, and distances that have been changed in FIGS. 2A to 2D and FIGS. 4A to 4E are identical.

In contrast, the signals shown in FIGS. 2C and 2D are not necessarily linear when viewed in a wide range. To detect the position linearly, a method of, for example, storing this function and referring to a look-up table may be used. Furthermore, as described in the disclosure of FIG. 4E, the calculation in the present embodiment that is robust to the change of the distance in the separating direction is also robust to temperature. It can be seen in formulae of Formula 5 and Formula 6 that the calculation that divides a signal is included, and non-dimensionalization is applied, similar to the calculation formula of (Formula 2). This non-dimensionalization makes enables being robust to the change of the magnetic field strength due to the change of the distance and the like.

Figure 6A:
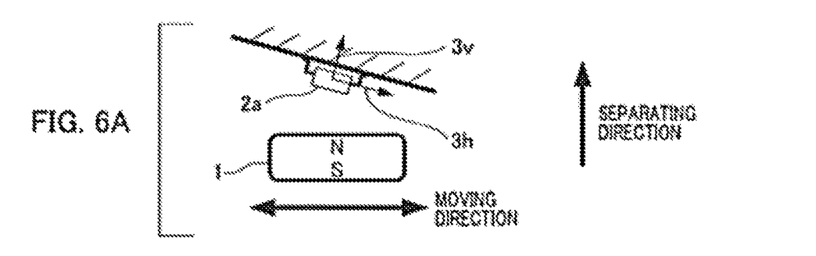
FIGS. 6A to 6D illustrate an output of the position detection device in the Embodiment 1.
Figure 6B:
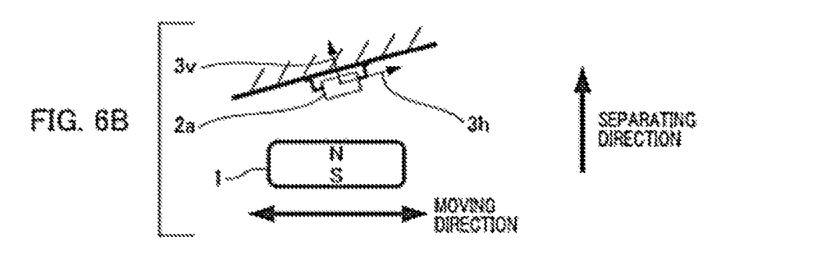

FIGS. 6A to 6D illustrate the output of the position detection device in the Embodiment 1, in a case where the magnet and the element relatively rotate around the axis orthogonal to the separating direction and the moving direction. FIG. 6A illustrates a state in which the magnet and the element rotate in the same direction as the rotational direction shown in FIG. 5A. FIG. 6B illustrates a state in which the magnet and the element rotate in the same direction as the rotational direction shown in FIG. 5B.

Figure 6C:
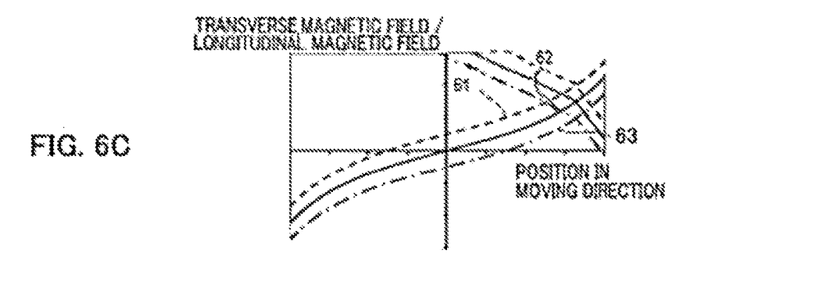

The magnetic field detected by the longitudinal magnetic field detection unit 3v and the transverse magnetic field detection unit 3h respectively directs the directions shown in FIGS. 6A and 6B. FIG. 6C illustrates a calculation result using Formula 5 in different tilt states. The three functions 61, 62, and 63 respectively correspond to FIG. 6A, FIG. 4A, and FIG. 6B, which show different tilt states. In this example, if the tilts are different, the offset is simple in Formula 5 and Formula 6. In Formula 6, the ratio of the longitudinal magnetic field and transverse magnetic field is substituted into the inverse tangent function. Because this is the same as calculating the direction of the magnetic field in the magnetic detection unit 2a, it can be seen that the offset is simple, which corresponds to errors due to tilt. If the tilt is not large, it is possible to approximate $\tan\theta=\theta$. In other words, in Formula 5 as well, it can be seen that, around the starting point, the offset is simple, which corresponds to errors due to tilt. FIG. 6C illustrates an output obtained by dividing the transverse magnetic field strength by the longitudinal magnetic field strength, which corresponds to Formula 5.

Figure 6D:
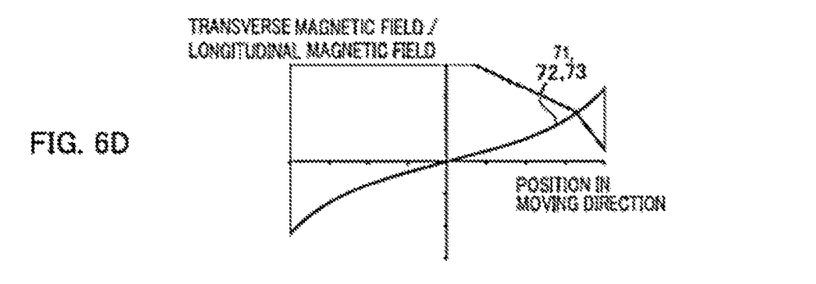

The output when the offset adjustment is performed by the assembly adjustment is shown in FIG. 6D. Curves 71, 72, and 73 in FIG. 6D show offset adjustment such that each of the curves 61, 62, and 63 in FIG. 6C passes through the starting point. Referring to FIG. 6C, it can be seen that the three curves 71, 72, and 73 that differ in tilt uniformly overlap.

Comparing FIG. 6D and FIG. 5D, it can be said that the three functions 71, 72, and 73 that are calculated using Formula 5 are influenced with more difficulty by the rotation around the axis that is orthogonal to both of the separating direction and the moving direction, and are thus more robust than the calculation result using Formula 2. In the present embodiment, because two magnetic detection units that differ in direction is provided in one element 2a, the distance between the two magnetic detection units and the magnet change in the same way with respect to the rotation in the direction shown in FIGS. 6A and 6B. Additionally, in the present embodiment, the magnetic detection unit can be accommodated in a single package, and accordingly the device can also be miniaturized.

Figure 7A:
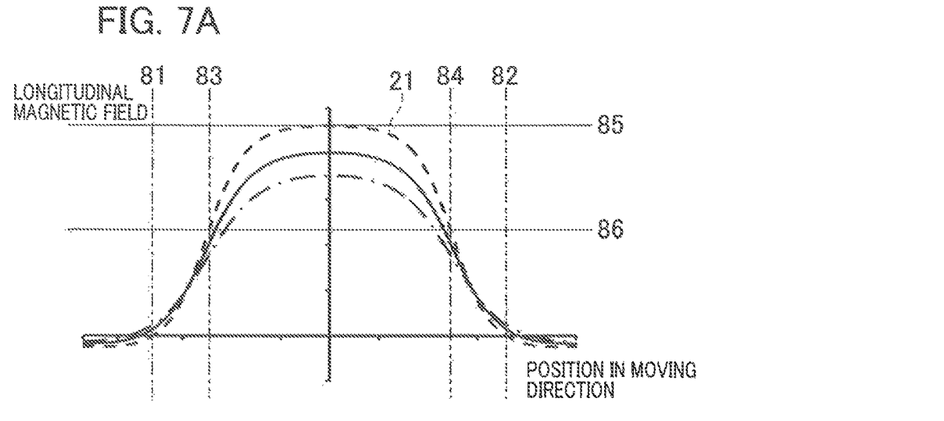
FIGS. 7A to 7C illustrate characteristics of (Formula 5) and (Formula 6), and proper use thereof.
Figure 7B:
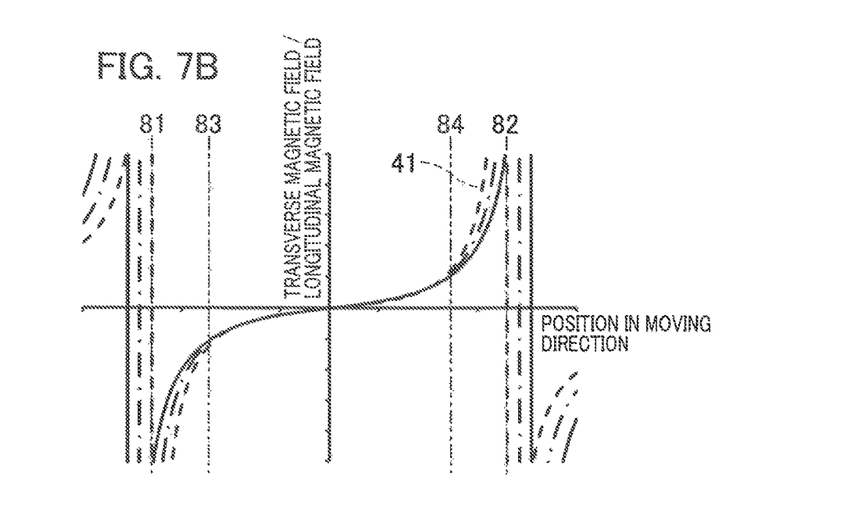
Figure 7C:
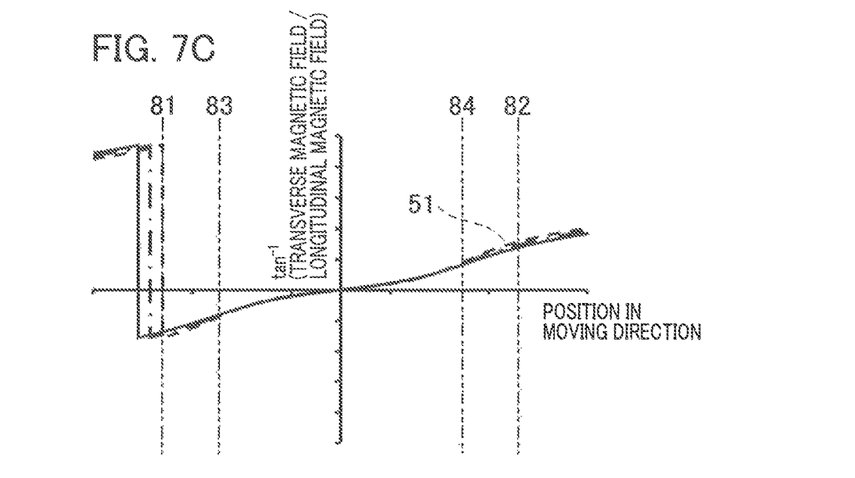

FIGS. 7A to 7C illustrate the characteristics and proper use of Formula 5 and Formula 6. FIG. 7A illustrates a strength of the longitudinal magnetic field. The horizontal axis represents a position in the moving direction, the vertical axis represents a strength in the longitudinal magnetic field, which are the same as those in FIG. 3B. FIG. 7B illustrates a calculation result that has been performed using Formula 5, aligning the scale of the horizontal axis with FIG. 7A. FIG. 7C illustrates a calculation result that has been performed using Formula 6, in which the scale of the horizontal axis is aligned with FIG. 7A. In FIGS. 7A to 7C, two-dot chain lines 81, 82, 83, and 84, which extends longitudinally, indicate that they are at the same time.

While only a division calculation is performed in Formula 5, an inverse tangent function is calculated in Formula 6, and therefore, Formula 5 is better in terms of the amount of calculation. Additionally, even when the device is configured by only an analog circuit, complex functions such as inverse tangent function are unnecessary, so that Formula 5 is better. In contrast, a division calculation is performed in Formula 5, and the calculation becomes unstable if the denominator approaches zero. In FIG. 3B, the longitudinal magnetic field intersects the horizontal axis, and the longitudinal magnetic field strength becomes zero at a certain distance. In such a case, in Formula 5, the calculation becomes unstable. Actually, it is possible to avoid the instability of the calculation by providing a stroke and a mechanical end so as not to approach division by zero.

Although division is required if Formula 6 is used as-is, in a program language such as C language, a function that calculates an inverse tangent function by taking two arguments is prepared, and using such functions makes it possible avoiding division by zero. In this case, a detectable stroke can be enlarged.

In FIG. 7A, reference numeral 85 shows the maximum value of the function 21, and reference numeral 86 shows a half position of the maximum value. Function 21 is zero at positions 81 and 82. At this time, the result for division diverges to be an infinitely large value. Because FIG. 7B shows a finite range, the calculation result cannot be shown. In contrast, the inverse tangent function is zero in the vertical direction, the calculation is performed such that the position 81 corresponds to 270 degrees and the position 82 corresponds to 90 degrees, and values are continuously calculated also before and after these.

In order to avoid division by a value close to zero, a value of the longitudinal magnetic field signal, which is a signal as divisor in division, may be used in a range larger than a half of the maximum value 85. As can be seen from FIG. 7A, while the longitudinal magnetic field signal slightly changes in the vicinity of the center, the tilt thereof is large in the peripheral portion. Thus, in this example, taking into consideration errors caused by assembly and the like, a range for avoiding division by a value close to zero with a certain margin is set to a range in which the value of the longitudinal magnetic field signal is larger than a half of the maximum value 85.

In the example shown in FIG. 7A, the position 86, in which the absolute value of the maximum value 85 becomes half, is considered. If the position detection range is set in the range of the position 83 to the position 84, which is a range in which the position 86 intersects with the function 21, division is stabilized, and as a result, Formula 5 can be used. In order to restrict the position detection range to the above range, the relative movement may be restricted. In other words, the position detection device may provide a movement restriction member that restricts the relative movement between the magnetic detection unit and the magnet so as to avoid the signal serving as divisor in division (Formula 5) by the calculation unit 5 being less than a half of the maximum value.

That is, Formula 5 has the merit that calculation is simple and Formula 6 has the merit that a stroke can be enlarged. A referred one of Formula 5 and Formula 6 may be used depending on an application to be applied. Further, the two calculation methods may selectively be used depending on the moving range. Inverse tangent function may be calculated only when the moving amount increases, the absolute value of the signal serving as the divisor in the division is smaller than a value that has been set in advance, and it approaches division by zero. That is, the calculation unit 5 switches the calculation of the position detection signal by using either calculation by division (Formula 5) or inverse tangent function (Formula 6) depending on the relative moving amount between the magnetic detection unit and the magnet. This allows detection in a wide range while appropriately reducing a calculation load. According to the Embodiment 1 described above, it is possible to provide a position detection device with a simple structure that is robust to assembly errors and environmental changes.

Embodiment 2

Figure 8A:
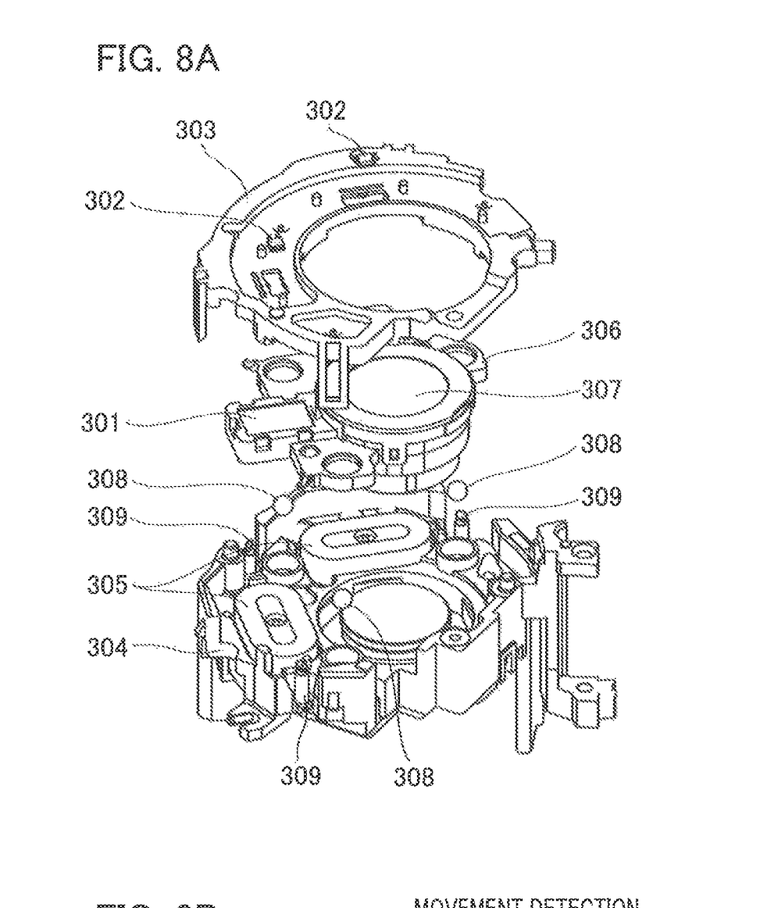
FIGS. 8A and 8B illustrate a configuration of an anti-shake mechanism having the position detection device.
Figure 8B:
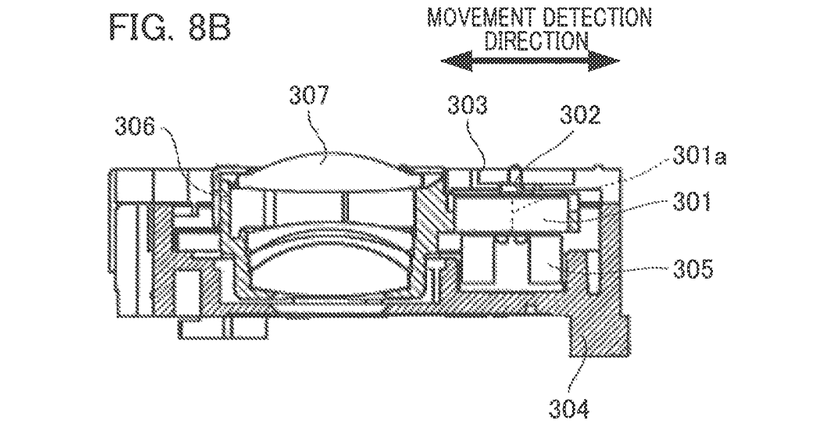

The position detection device in Embodiment 2 has two-pole magnets, each including the N pole and the S pole. The position detection device in the present embodiment is applied to the digital camera 101 shown in FIGS. 1A to 1C. FIGS. 8A and 8B illustrate a configuration of an anti-shake mechanism having the position detection device. FIG. 8A illustrates an exploded perspective view of the anti-shake mechanism that is a part of the lens barrel. FIG. 8B illustrates a cross-sectional view of the anti-shake mechanism including the position detection device.

In FIGS. 8A and 8B, reference numeral 301 shows a magnet. Reference numeral 301a shows a magnetization boundary. Reference numeral 302 shows a magnetic detection unit. Reference numeral 303 shows a holding portion of the magnetic detection unit. Reference numeral 304 shows a fixed part of the anti-vibration mechanism. Reference numeral 305 shows coils that drive an anti-shake lens. Reference numeral 306 shows a movable frame that holds the lens. Reference numeral 307 shows the anti-shake lens. Reference numeral 308 shows three balls that form a guide surface. Reference numeral 309 shows three springs that hold the movable frame.

In the digital camera 101 (FIGS. 1A to 1C), anti-shake control starts by the user's operation using the operation member 103. The anti-shake lens 307 provided in the lens barrel 102 moves in a plane orthogonal to the optical axis 104, so that an anti-shake operation (an image blur correction operation) is performed.

In order to realize the anti-shake operation, the magnet 301 and the anti-shake lens 307 are fixed to the movable frame 306, and the drive coils 305, the holding portion 303 of the magnetic detection unit, and the magnetic detection unit 302 is fixed to the fixed portion 304 of the anti-shake mechanism. Furthermore, with respect to the fixed portion 304 of the anti-shake mechanism, the three balls 308 are arranged in the movable frame 306 while charging the movable frame 306 by the three springs 309, and accordingly the balls 308 are held. This structure allows the movable frame 306 to move in a plane on a guide surface formed by the three balls 308 and allows the magnet 301 and the magnetic detection unit 302 to relatively move while maintaining a constant interval. By energizing the two coils 305, the magnet 301 and the magnetic detection unit 302 can be moved in two-axial directions in a plane orthogonal to the optical axis.

In order to perform the anti-shake control appropriately, the lens 307 needs to be moved to a specific position based on the signal of the blur sensors (not illustrated). That is, a position detection device for positioning is required. In the examples shown in FIGS. 8A and 8B, the magnet 301 and the magnetic detection units 302 are provided, and the position of the movable frame 306 is detected from a signal of the magnetic detection unit 302. In FIG. 8A, although there appears to be only one the magnet 301, there are two magnets at the angle of 90 degrees, so as to correspond to the coils 305 and the magnetic detection units 302. Accordingly, driving and position detection in two-axis directions is allowed.

The cross section of FIG. 8B includes a magnetization boundary 301a, and on this boundary, the magnet 301 is magnetized in directions that differ in the vertical direction of the drawing sheet. By energizing the coil 305, a force due to Fleming's left-hand rule is generated. The relative moving direction between the magnet and the magnetic detection unit due to energizing the coil 305 is the horizontal direction in FIG. 8B. A direction in which the position is detected by the magnet 301 and the magnetic detection units 302 (moving detection direction) is also the horizontal direction of FIG. 8B.

Figure 9A:
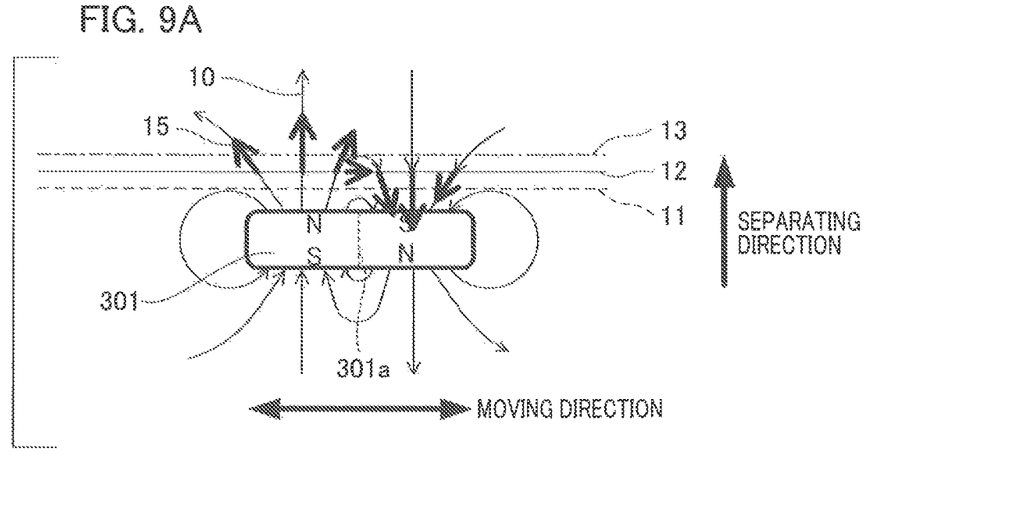
FIGS. 9A to 9C illustrate a magnetic field in Embodiment 2.
Figure 9B:
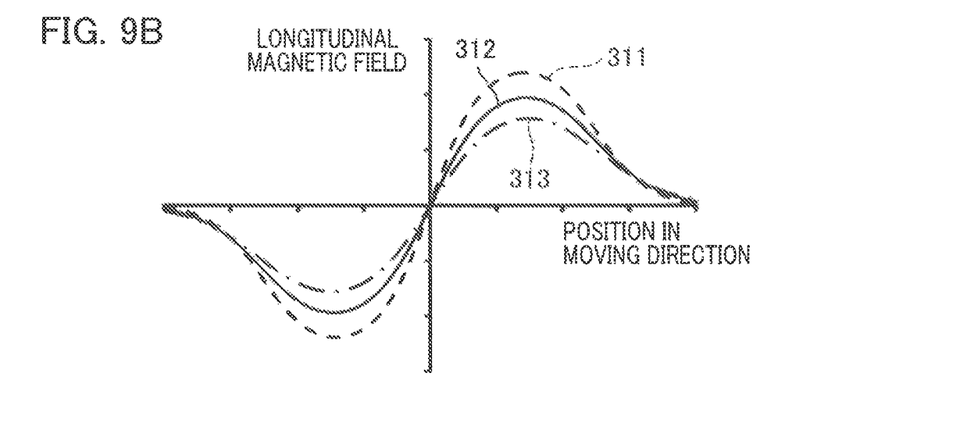
Figure 9C:
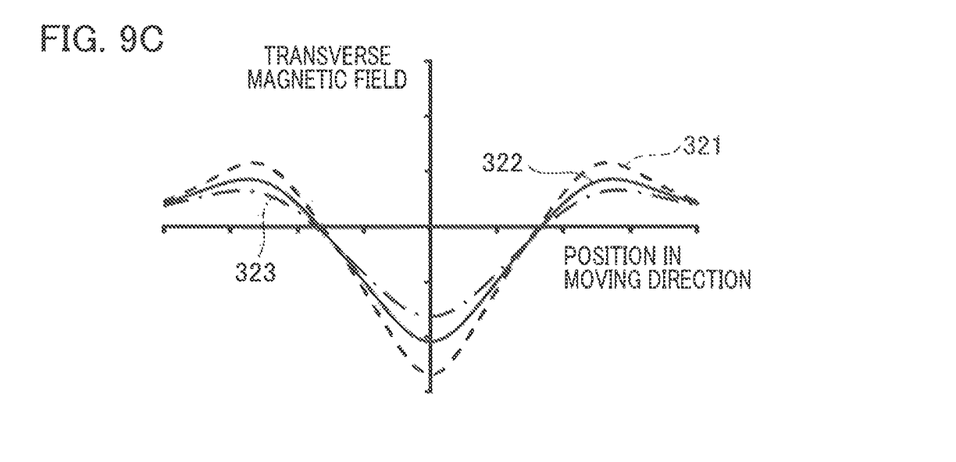

FIGS. 9A to 9C illustrate a magnetic field in the Embodiment 2. Also in the present embodiment, similarly to the Embodiment 1, a direction in which the magnet and the magnetic detection unit separate from each other is defined as a longitudinal magnetic field, and a direction in which the magnet and the magnetic detection unit relatively move is defined as a transverse magnetic field. In FIGS. 9A to 9C, same reference numerals are provided for parts that are the same as those in FIGS. 3A to 3C. In FIG. 9A, reference numeral 301 shows a magnet, and reference numeral 301a shows a magnetization boundary. The cross section of FIG. 9A shows a section that is cutout along a plane, including a direction in which the magnet and the magnetic detection unit relatively move, and a direction in which the magnet and the magnetic detection unit separate from each other. In the present embodiment, the magnet 301 has a plurality of magnetization units having mutually reversed polarities, serving as a plane orthogonal to the relative moving direction between the magnetic detection unit and the magnet as a polarity boundary plane. In the present embodiment, although one magnet 301 has a magnetization boundary, a magnetic circuit may be configured by arranging two single-pole magnets closely in directions opposite to each other.

In the direction perpendicular to the drawing sheet of FIG. 9A, a magnet extends a predetermined length, having a configuration that is robust to assembly errors in a direction perpendicular to the drawing sheet. As shown in FIG. 9A, a vector representing the magnetic field strength is detected as shown by the arrow 15 while changing the length and angle in a plane in which the magnetic detection unit is present. That is, the vector becomes parallel to the moving direction in the vicinity of the center of the magnet 301, the vector direction becomes parallel to the separating direction in the vicinity of the center of one magnetization region, and the vector tilts again toward a further end.

FIGS. 9B and 9C respectively illustrate the magnetic field strength of the longitudinal magnetic field and the transverse magnetic field with respect to the position in the moving direction. The horizontal axis represents the position in the moving direction. The vertical axis represents the magnetic field strength. The magnetic field strength shown by reference numerals 311, 312, and 313 in FIG. 9B each correspond to the planes 11, 12, and 13 in FIG. 9A. Additionally, the magnetic field strengths shown by reference numerals 321, 322, and 323 in FIG. 9C also respectively correspond to the planes 11, 12, and 13 in FIG. 9A.

The horizontal axis in FIGS. 9B and 9C represents the position in the moving direction, and the intersection of the vertical axis represents the magnet center. As shown in FIG. 9B, the magnetic field strength of the longitudinal magnetic field becomes zero at the center of the magnet, forming an S-shaped curve. Additionally, the curves 311, 312, and 313 of the magnetic field strengths in the detection planes 11, 12, and 13 show the tendency that the difference between the maximum value and the minimum value is larger if the detection is performed at a position near the magnet.

As shown in FIG. 9C, an axisymmetric curve is formed in the transverse magnetic field, and in the magnetic field strength, a curve that has an extreme value at the magnet center and also has an extreme value at the position slightly apart from the center is formed. Additionally, the curves 321, 322, and 323 of the magnetic field strength in the detection planes 11, 12, and 13 show a tendency in which the peak strength is stronger if the detection is performed at a position near the magnet. In the conventional anti-shake mechanism, position detection is performed by using only the longitudinal magnetic field detection. That is, with respect to the position in the moving direction, of the S-shaped functions of FIG. 9B, a portion having high linearity in the vicinity of the starting point is used. Because this method narrows detection rang, it is not robust to errors.

Figure 10A:
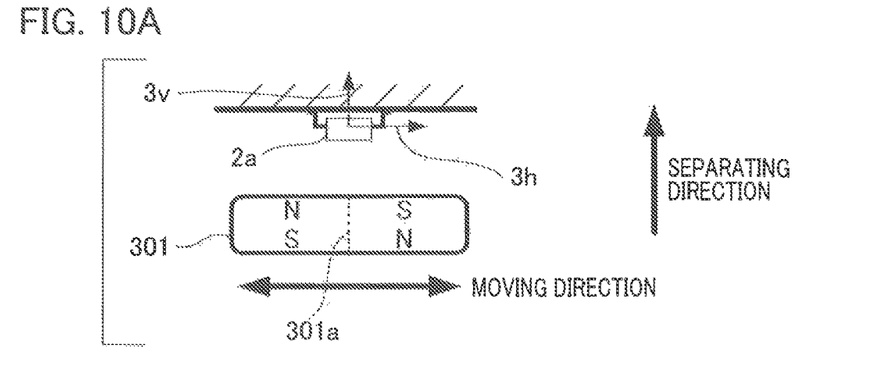
FIGS. 10A to 10D illustrate a configuration and an output of the position detection device in the Embodiment 2.

FIGS. 10A to 10D illustrate a configuration and output of the position detection device of the Embodiment 2. FIG. 10A illustrates arrangement of the magnet and the magnetic detection unit provided in the position detection device. In FIGS. 10A to 10D, the same reference numerals are provided for parts having the functions that are the same as those in FIG. 2A to 2D. Reference numeral 301 shows a magnet. The element 2a includes the longitudinal magnetic field detection unit 3v and the transverse magnetic field detection unit 3h inside thereof, and it is the magnetic detection unit in the present embodiment. The detection unit is located in the vicinity of the center of the element 2a, and the longitudinal magnetic field detection unit and the transverse magnetic field detection unit are formed so as to be stacked in the separating direction. The magnet 301 and the element 2a are relatively movable in the horizontal direction of the drawing sheet in FIG. 10A. In this example, although the element 2a is fixed, it is sufficient if the magnet 1 and the element 2a relatively move, and it is also sufficient that the element 2a is moved while fixing the magnet 1. Additionally, the relative movement between the magnet 301 and the element 2a is guided to occur while maintaining a constant interval in the separating direction.

Figure 10B:
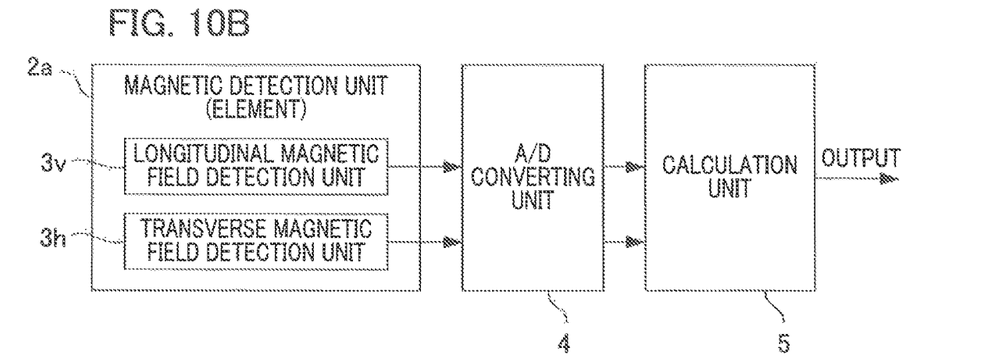

FIG. 10B shows a flow of the signal in the position detection device. The signal acquired from the longitudinal magnetic field detection unit 3v and the transverse magnetic field detection unit 3h provided in the element 2a is input to the A/D converting unit 4. The A/D converting unit 4 converts the signal that has been input into a digital signal and inputs it to the calculation unit 5. The calculation unit 5 calculates using Formula 7 or Formula 8 shown below, based on the signal that has been input, and outputs an output signal.

(Output signal)=(longitudinal magnetic field strength)/(transverse magnetic field strength) (Formula 7)

(Output signal)=$\tan^{-1}${(longitudinal magnetic field strength)/(transverse magnetic field strength)} (Formula 8)

The difference between Formula 7 and Formula 8, and the aforementioned Formula 5 and Formula 6 is only that the longitudinal magnetic field and the transverse magnetic field are reversed in the denominator and numerator. Because the characteristics of the signal and the determination about which formula should be used are the same as those in the Embodiment 1, the description thereof will be omitted, and in the following, the calculation result that has been acquired by using Formula 7 will be compared with the prior art that outputs the longitudinal magnetic field.

Figure 10C:
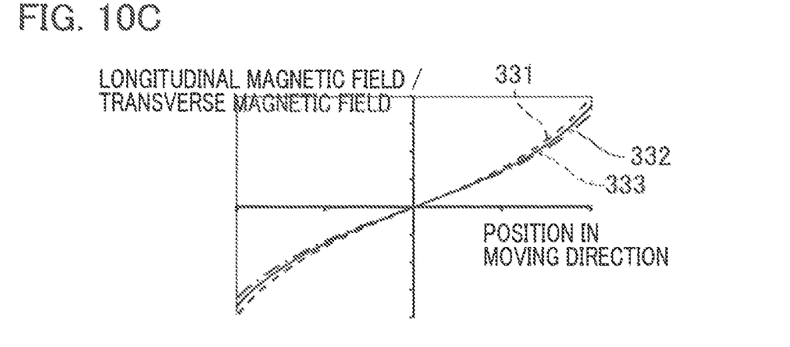
Figure 10D:
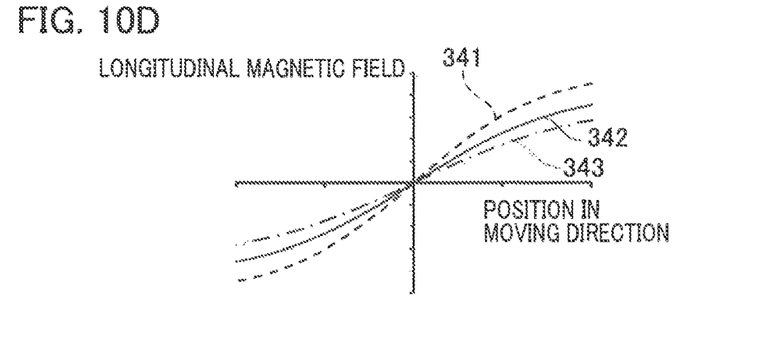

FIG. 10C illustrates an output of the calculation unit 5 provided in the position detection device in the Embodiment 2. FIG. 10D illustrates an output of the conventional position detection device. In FIGS. 10C and 10D, the horizontal axis represents the position of the scale in the moving direction, which is the same as those in FIGS. 2A to 2D. The vertical axis represents an output of the calculation unit. Calculation results in a case in which the magnet and the magnetic detection units are closely located is shown in the order of reference numerals 331, 332, and 333 in FIG. 10C, and reference numerals 341, 342, and 343 in FIG. 10D.

The three functions 331, 332, and 333 in FIG. 10C approach each other more than the three functions 341, 342, and 343 in FIG. 10D, and it can be seen that they are robust to the distance change in the separating direction. The calculation of the present embodiment is robust to distance change in the separating direction, it is also robust to temperature. According to the Embodiment 2 described above, it is possible to provide a position detection device with a simple configuration that is robust to assembly errors and environmental changes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-125234, filed Jun. 23, 2015 which is hereby incorporated by reference wherein in its entirety.

What is claimed is:

1. An imaging device comprising:
   a magnetic detector;
   a magnet;
   a coil that moves a holding body holding a lens by energization; and
   a calculator that calculates a position detection signal for detecting a position of the holding body,
   wherein the magnet and the magnetic detector are relatively movable while maintaining a predetermined interval,
   wherein the magnetic detector has a first magnetic field detector that detects a magnetic field in a separating direction between the magnetic detector and the magnet, and a second magnetic field detector that detects a magnetic field in a moving direction of the magnet,
   wherein the magnet has a configuration in which two magnetized portions having reversed polarities are arranged along the moving direction,
   wherein the magnet has a magnetization boundary on which the magnet is magnetized,
   wherein the magnet is a single magnet that has a plurality of magnetized units having mutually reversed polarities of each other, using a plane orthogonal to a relative moving direction between the magnetic detector and the magnet as a polarity boundary plane,
   wherein the coil is divided into a first region and a second region which are separated from each other in a cross section cut by a plane including the moving direction and the separation direction,
   wherein the first region of the coil faces one of the two magnetized portions of the magnet in the moving direction, and the second region of the coil faces the other one of the two magnetized portions of the magnet in the moving direction, and
   wherein the calculator calculates the position detection signal based on a signal of the second magnetic field detector and a signal of the first magnetic field detector.

2. The imaging device according to claim 1,
   wherein the calculator divides either one of the signal of the second magnetic field detector or the signal of the first magnetic field detector by the other one thereof, or performs calculation by inverse tangent function based on the signal of the second magnetic field detector and the signal of the-first magnetic field detector.

3. The imaging device according to claim 2,
   wherein the calculator switches calculation of the position detection signal by using either of the division or the calculation by the inverse tangent function, in response to a relative moving amount between the magnetic detector and the magnet.

4. The imaging device according to claim 2,
   wherein, in the calculation by the inverse tangent function, the calculator performs calculation, using a result acquired by dividing either one of the signal of the second magnetic field detector or the signal of the first magnetic field detector by the other one thereof as a variable.

5. The imaging device according to claim 1, wherein the magnet is provided on the holding body.

6. The imaging device according to claim 1, wherein the magnetic detector is disposed to face a first surface of the magnet, and
   wherein the coil is disposed to face a second surface located on the back side of the first surface of the magnet.

7. A control method for an imaging device comprising a magnetic detector and a magnet that are relatively movable while maintaining a predetermined interval, and a coil that moves a holding body holding a lens by energization,
   the magnetic detector having a first magnetic field detector that detects a magnetic field in a separating direction between the magnetic detector and the magnet, and a second magnetic field detector that detects a magnetic field in a moving direction of the magnet,
   the magnet having a configuration in which two magnetized portions having reversed polarities are arranged along the moving direction,
   wherein the magnet having a magnetization boundary in which the magnet is magnetized,
   wherein the magnet is a single magnet that has a plurality of magnetized units having mutually reversed polarities of each other, using a plane orthogonal to a relative moving direction between the magnetic detector and the magnet as a polarity boundary plane,
   the coil being divided into a first region and a second region which are separated from each other in a cross section cut by a plane including the moving direction and the separation direction,
   the first region of the coil facing one of the two magnetized portions of the magnet in the moving direction, and the second region of the coil facing the other one of the two magnetized portions of the magnet in the moving direction, the method comprising:
   calculating a position detection signal based on a signal of the second magnetic field detector and a signal of the first magnetic field detector.

* * * * *